United States Patent [19]

Stankowski

[11] Patent Number: 5,269,917
[45] Date of Patent: Dec. 14, 1993

[54] FILTRATION APPARATUS HAVING STRESS RELIEF GROOVE

[75] Inventor: Ralph J. Stankowski, Westford, Mass.

[73] Assignee: Millipore Corporation, Bedford, Mass.

[21] Appl. No.: 843,496

[22] Filed: Feb. 28, 1992

[51] Int. Cl.$^5$ .................. B01D 25/00; B01D 27/08
[52] U.S. Cl. .................. 210/232; 210/321.75; 210/321.84; 210/446; 210/455; 55/511; 156/73.1
[58] Field of Search ............... 210/232, 321.75, 321.84, 210/446, 449, 455; 55/511, 501, 502, 503; 156/73.1; 264/DIG. 48

[56] References Cited

U.S. PATENT DOCUMENTS

| | | | |
|---|---|---|---|
| 3,932,153 | 1/1976 | Byrns | 210/446 |
| 3,954,625 | 5/1976 | Michalski | 210/446 |
| 4,157,967 | 6/1979 | Meyst | 210/449 |
| 4,277,338 | 7/1981 | Hoagland | 210/447 |
| 4,379,051 | 4/1983 | Hiesinger | 210/446 |
| 4,501,663 | 2/1985 | Merrill | 210/321.84 |
| 4,614,585 | 9/1986 | Mehra | 210/321.84 |
| 4,640,777 | 2/1987 | Lemonnier | 210/321.84 |
| 4,801,381 | 1/1989 | Niesen | 210/321.84 |
| 4,846,970 | 7/1989 | Bertelsen | 210/321.84 |
| 4,867,876 | 9/1989 | Kopf | 210/321.84 |
| 4,948,501 | 8/1990 | Klinkan | 210/321.84 |
| 4,992,219 | 2/1991 | Meunier | 156/73.1 |
| 5,011,555 | 4/1991 | Sager | 210/446 |
| 5,049,274 | 9/1991 | Leason | 156/73.1 |
| 5,108,709 | 4/1992 | Bugar | 210/446 |

*Primary Examiner*—Thomas M. Lithgow
*Attorney, Agent, or Firm*—Andrew T. Karnakis; Paul J. Cook

[57] ABSTRACT

A filtration apparatus formed by ultrasonically welding a top section to a base section with a filtration membrane interposed there between. One of the top section or base section has a plurality of radially extending energy directors and the other of the top section or base section has a circumferentially extending energy director in contact with the radially extending energy directors where ultrasonic welding is effected. The groove cosiverts some of the peeling load into texisle load.

6 Claims, 5 Drawing Sheets

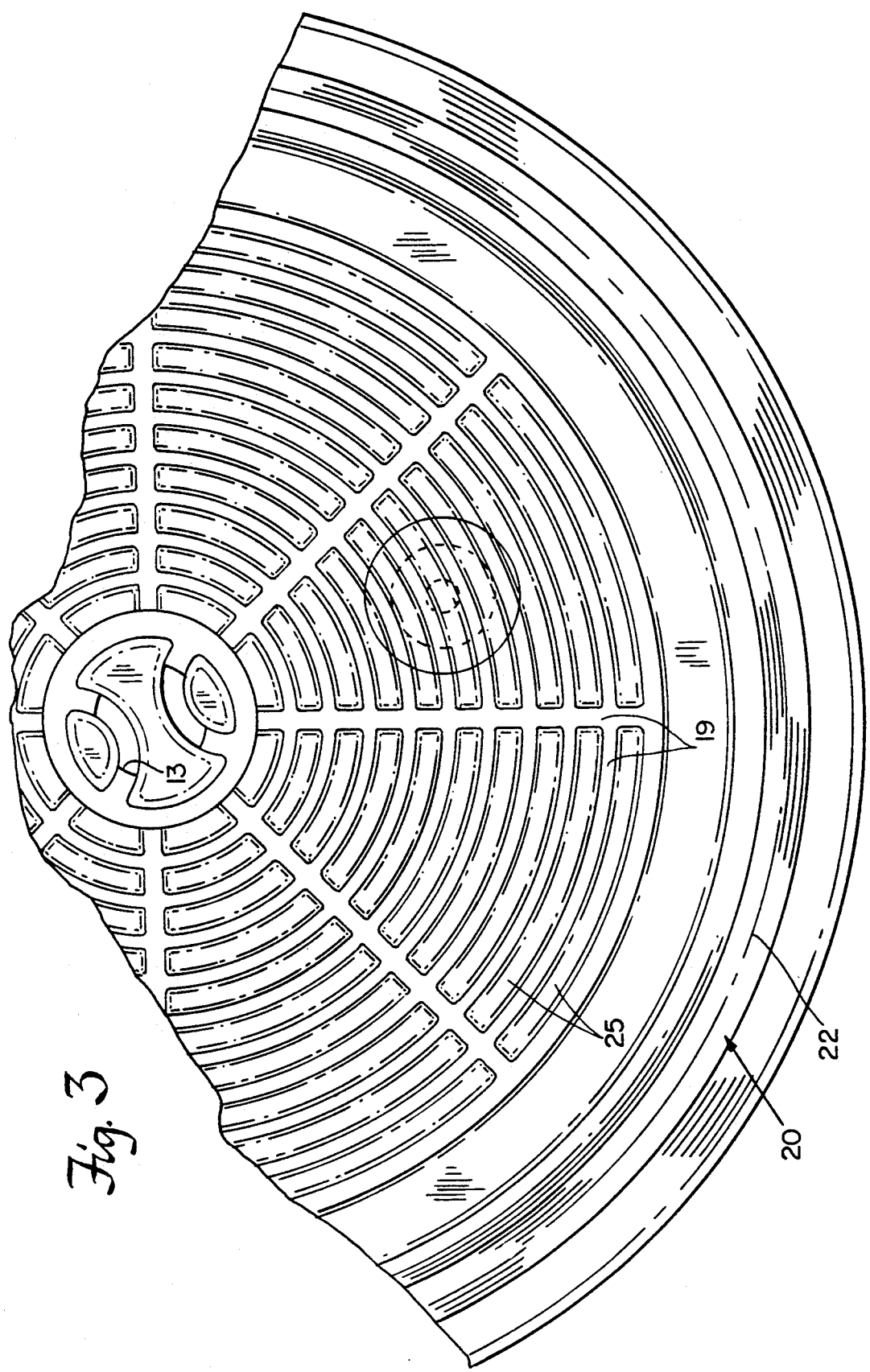

FILTRATION APPARATUS HAVING STRESS RELIEF GROOVE

BACKGROUND OF THE INVENTION

This invention relates to a filtration apparatus which includes a filtration membrane and a membrane support. More particularly, this invention relates to a filtration apparatus wherein a filtration membrane is positioned between a base section and a top section wherein the base section and top section are sealed together.

Prior to the present invention, filtration apparatus have been provided which comprise a filtration membrane positioned between a base section and a top section. Inlet means were provided for introducing a liquid sample in the space between the top section and the base section and an outlet means is provided in the base so that liquid sample passes through the filtration membrane and is removed from the space and through the outlet. The membrane is sealed between the top section and base section in a manner to prevent liquid from by-passing the membrane. That is, sealing is effected so that all of the sample introduced through the inlet passes through the filtration membrane prior to passing through the outlet. These filtration apparatus are utilized to filter solvents to remove particulates which can cause plugging or contamination of downstream equipment such as analytical equipment. These filtration apparatus also can be utilized to effect sterilization of conditioning of medium, growth factors, virus, protein column eluates or the like prior to biological assay. The membrane can be sealed to an internal peripheral surface of the base or the membrane can be sealed to both the top and the base and between the two. The membrane can be heat sealed or solvent bonded to the base section as disclosed in U.S. Pat. No. 4,501,663 or the membrane, can be ultrasonically welded between the base section and top section as disclosed for example in U.S. Pat. No. 4,640,777. With prior art devices the weld is effective but only up to moderate pressures, for example between about 50 and 75 psi for polyethylene devices and between 75 and 100 psi for devices made from a polycarbonate-polyester melt alloy.

Also, it has been proposed to utilize ultrasonic welding of a top section and a base section with a membrane positioned intermediate the top section and base section. Either the top section or base section is provided with an ultrasonic energy directing means having a triangular cross section and which extends about the periphery of the top section or base section. The energy direction means focuses the ultrasonic energy to the periphery of the top or base section where the energy direction means contacts an opposing top or base section thereby to effect sealing about the periphery of the filtration apparatus. This results in adequate sealing. However the burst pressure is limited since the final bond is relatively inflexible so that it has limited capability of absorbing peel forces prior to bursting.

Accordingly, it would be desirable to provide a filtration apparatus for clarifying or sterilizing liquids which is capable of withstanding high pressure in order to reduce the risk of apparatus failure during filtration.

SUMMARY OF THE INVENTION

In accordance with this invention, a base section and a top section which are joined together with a membrane interposed therebetween are provided with a stress relieving means. The stress relieving means comprises a load redistribution groove positioned adjacent the joint line where the two sections are joined. Both the groove and the joint line extend about the entire periphery of the filtration apparatus. In use, when pressure is increased within the filtration apparatus, the top section and base section are expanded away from each other at the groove. This expansion advantageously converts some of the pressure force from a peel force to a tensile force at the joint line. The bond between the two sections is formed by ultrasonic welding utilizing two sets of energy direction means. A first energy directing means is positioned on one of the top or base section and about the periphery of the top or base section and the second set of energy direction means comprises a plurality of energy directors extending radially on the opposing top or base section. The radially extending set of energy directors are in contact with and essentially perpendicular to the first energy directing means during welding.

BRIEF DESCRIPTION OF THE DRAWINGS

FIG. 3 is a partial top view of a base section of this invention

DESCRIPTION OF SPECIFIC EMBODIMENTS

The filtration apparatus of this invention is formed by ultrasonically welding a top section and a base section each having a set of energy directors positioned so that the sets of energy directors cross and contact each other during welding. In addition, a groove arrangement is provided adjacent to and positioned radially inward of the energy directors. The two sections are ultrasonically welded together so that least a portion of the energy directors is melted to effect the desired seal about the periphery of the filtration apparatus. A substantial portion of the groove remains open and free of material such as a molten plastic produced during welding. The groove functions as a means for redirecting pressure force thereby to alleviate or reduce stresses on the welded seal during use of the filtration apparatus. The filtration apparatus of this invention are capable of withstanding higher internal pressures as compared to similar filtration apparatus of the same size and materials which do not utilize cross energy directors and a load redistribution groove means. For example, in the structure of this invention the mean burst strength of devices made from polyethylene is about 150 psi and for devices made from a polycarbonate-polyester melt alloy is about 250 psi.

Figure 1:
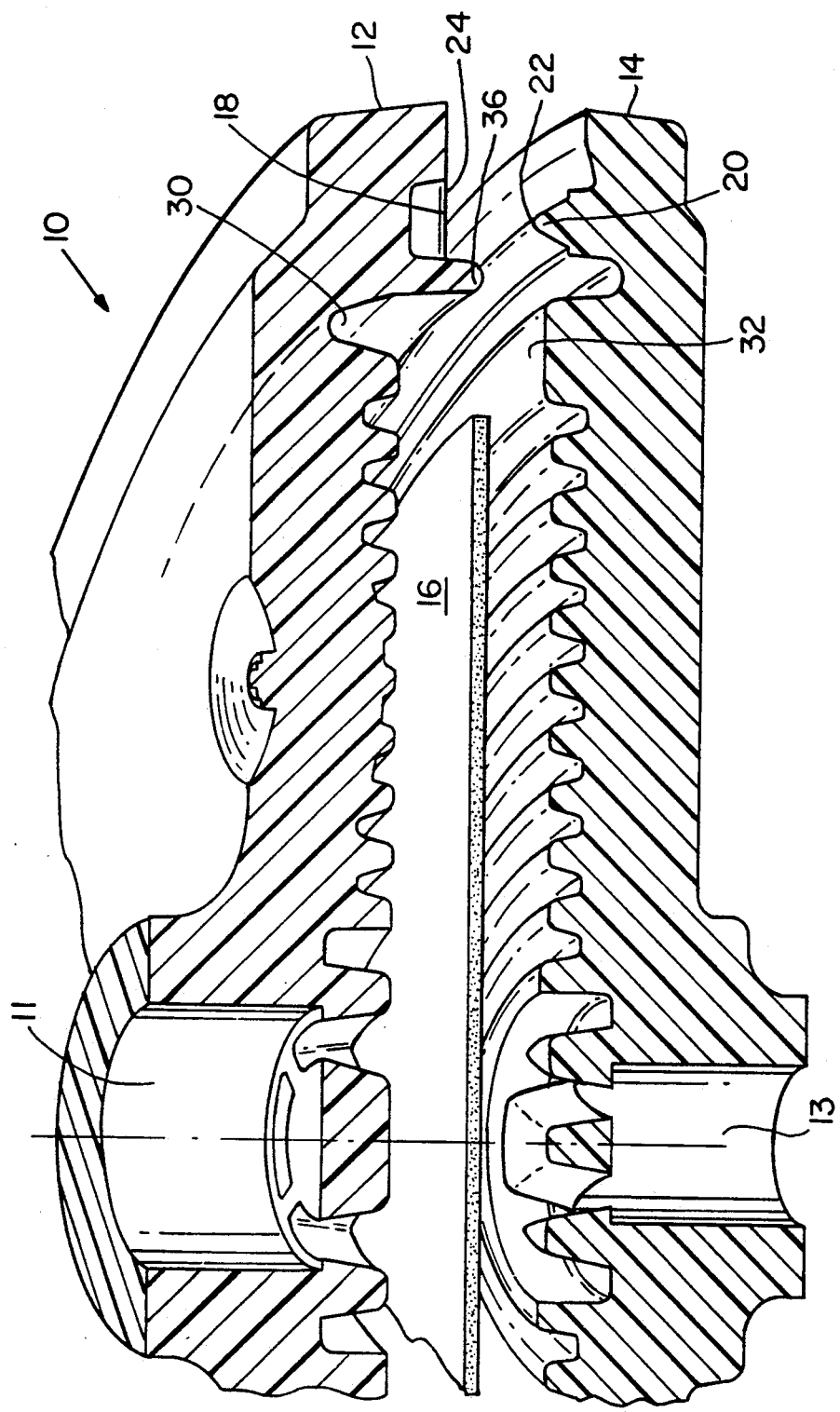
FIG. 1 is an isometric cross sectional view of a top section, a base section and a membrane forming the filtration apparatus of this invention prior to being welded together.
Figure 5:
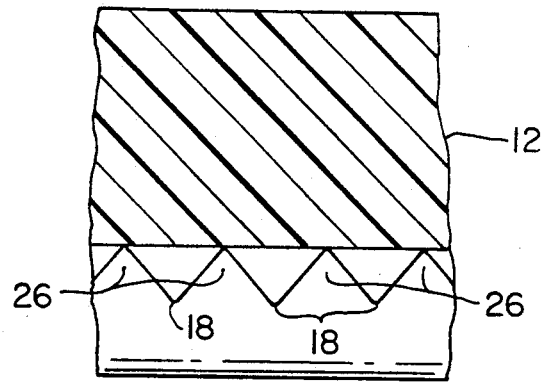
FIG. 5 is a cross sectional view of the top section of FIG. 4 taken along line 5—5.
Figure 4:
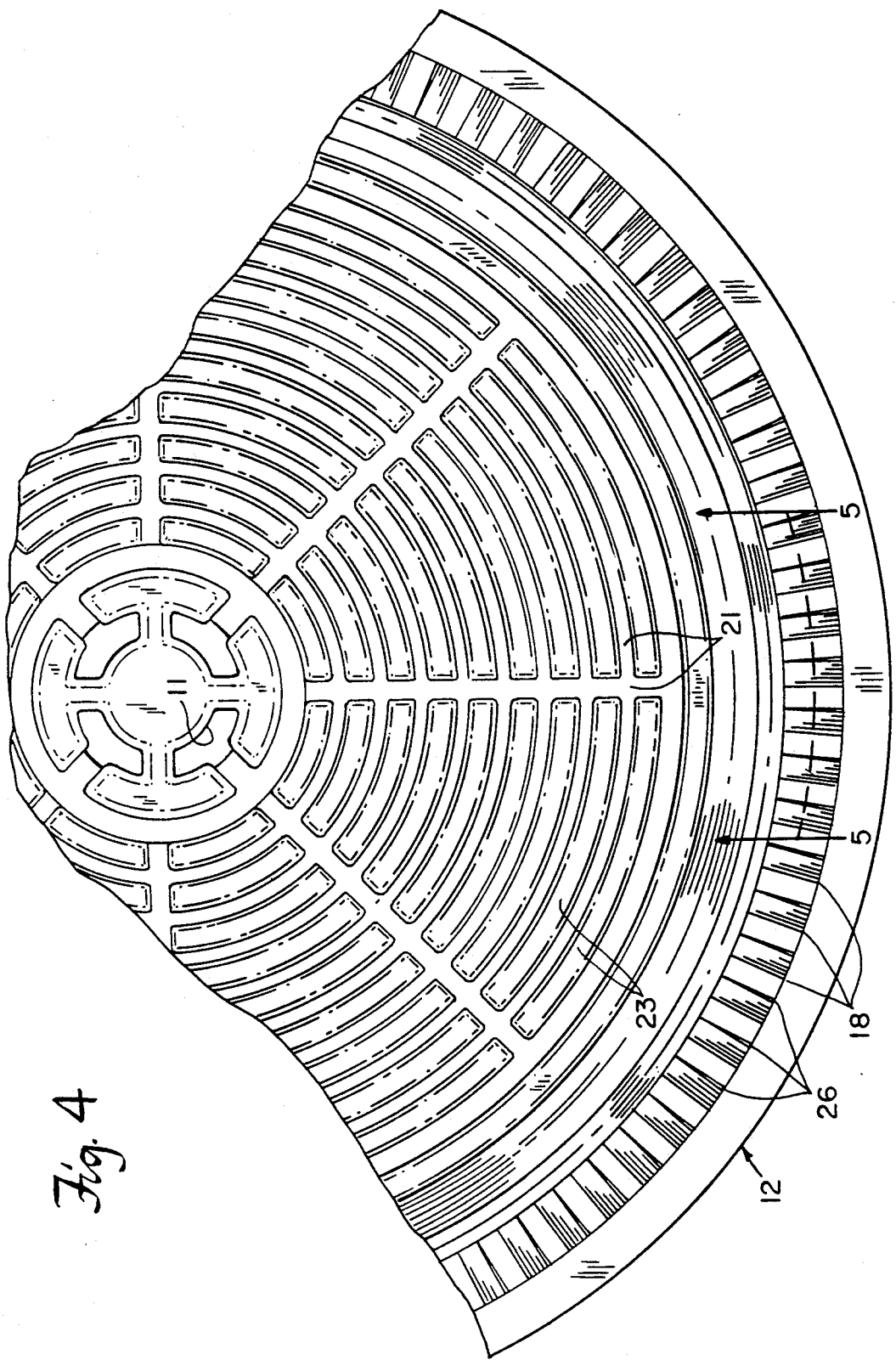
FIG. 4 is a partial bottom view of a top section of this invention.

Referring to FIG. 1, the elements forming the filtration apparatus 10 of this invention are shown prior to being welded together. The filtration apparatus includes a top section 12, a base section 14 and a filtration membrane 16 such as a microporous membrane or an ultrafiltration membrane. The top section 12 includes radially extending energy directors 18 which extend about the entire periphery of top section 12. The arrangement of radially extending energy directors 18 is best shown in FIGS. 4 and 5. Also, as shown in FIGS. 3 and 4, the top section 12 and the base section 14 can be provided with passageways 19 or 21 which are defined by adjacent wedges 23 or 25. The base section 14 includes an energy director 20 having a triangular-like cross section which functions to direct ultrasonic energy to the region of the tip 22 and cause the polymeric material forming the bottom section to melt. Similarly, the radially positioned energy directors 18 have a triangular-like cross section so as to focus ultrasonic energy at the tip 24 and cause the polymeric material forming the top section to melt. The tips 22 and 24 contact each other during welding and sufficient polymeric material from energy directors 18 and 20 are melted to fill the voids 26 between energy directors 18 which is then subsequently solidified to form a leak-proof seal about the entire periphery of the filtration apparatus 10. It is to be understood that the position of the energy directors 18 and 20 can be reversed. That is, radial energy directors can be positioned on base section 14 and the peripheral energy director 20 can be positioned on the top section 12. In any event, the groove 30 is positioned adjacent peripheral energy director 20 either on top section 12 or base section 14. As shown in FIG. 1, the membrane 16 can extend into groove 30 to be sealed with molten polymeric material. In addition, the membrane 16 can be heat sealed to the peripheral portion 32 of base section 14 to form a desired seal. The shield 36 (FIG. 2) provides a means for controlling flow of molten polymeric so as to prevent its contact with the membrane 16, if desired.

In order to obtain the desired sealing with the energy directors 18 and 20 to fill spaces 26, the height of the energy directors 18 typically is between about 0.4 and 0.6 mm while the height of energy director 20 is larger than that of energy director 11 and typically is between about 0.6 and 0.9 mm.

Figure 2:
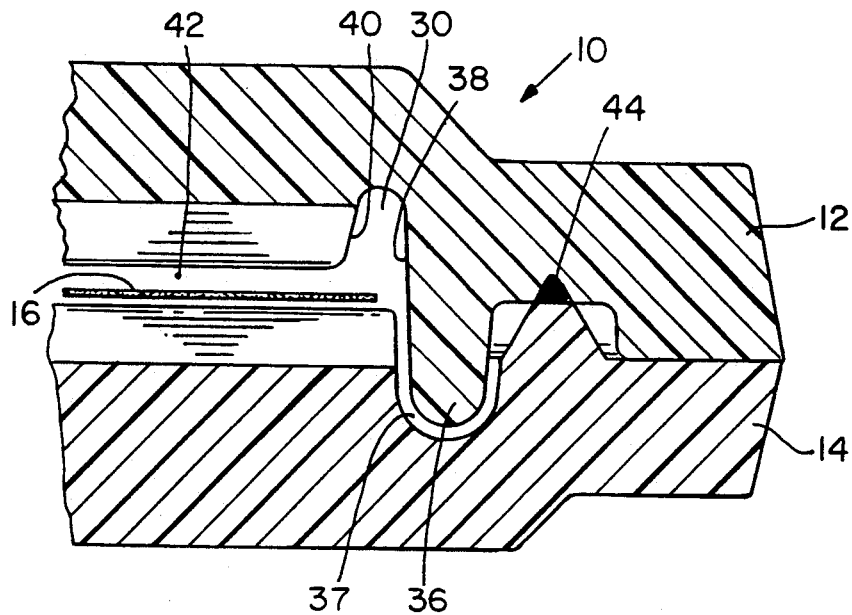
FIG. 2 is a cross sectional view of the joined elements forming the filtration apparatus of this invention.

Referring to FIG. 2 the filtration apparatus 10 of this invention is shown after ultrasonic welding has been effected. The molten plastic formed during welding extends into a portion of the path 37 formed between the shield 36 and the base section 14. The groove 30 remains open and free of plastic. The grooves permits expansion and contraction of the length between surfaces 38 and 40 when pressure changes occur within the open area 42 in filtration apparatus 10 when liquid enters inlet 11 and is removed through outlet 13 (See FIGS. 1, 3 and 4). This expansion and contraction redirects pressure force and reduce the stress at the weld 44 between the top section 12 and the base section 14. Thus, the weld 44 is capable of retaining its integrity at increased internal pressures as compared with presently available designs which are devoid of such a pressure absorbing means.

Figure 6:
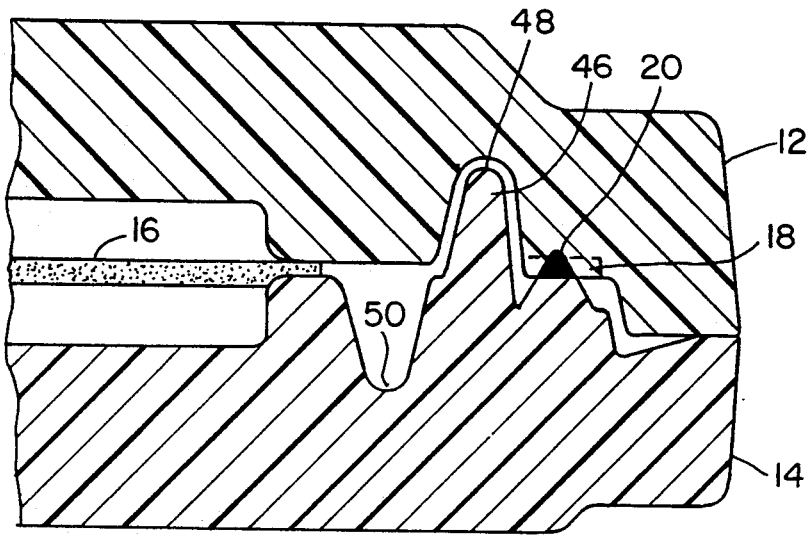
FIG. 6 is a cross-sectional view of an alternative stress relieving means for the structure of this invention.

Referring to FIG. 6, an embodiment of this invention is shown wherein a shield is positioned on the same section as an energy director 20 which extends about the entire periphery of the filtration apparatus. The shield 46 on base section 14 extends into groove 48 of top section 12. A second groove 50 is provided in base section 14. The membrane 16 is sealed between top section 12 and base section 14. The grooves 48 and 50 function in the manner described above to relieve stress during use of the filtration apparatus. The radially extending energy directors 18 and the peripherally extending energy directors 20 are shown in dotted lines to represent their typical initial relative heights. This depiction also is shown in FIGS. 7 and 8.

Figure 7:
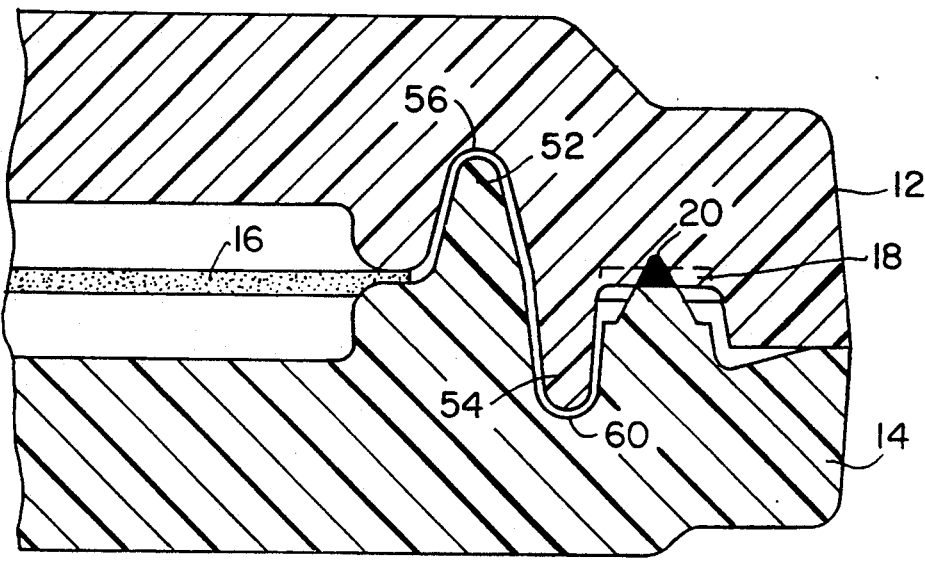
FIG. 7 is a cross-sectional view of an alternative stress relieving means for this invention using two shields.

Referring to FIG. 7, the embodiment of this invention is shown utilizing two shields 52 and 54 which extend respectively into grooves 56 on to section 12 and groove 60 on base section 14. The grooves 56 and 60 and shields 52 and 54 function in the manner described above.

Figure 8:
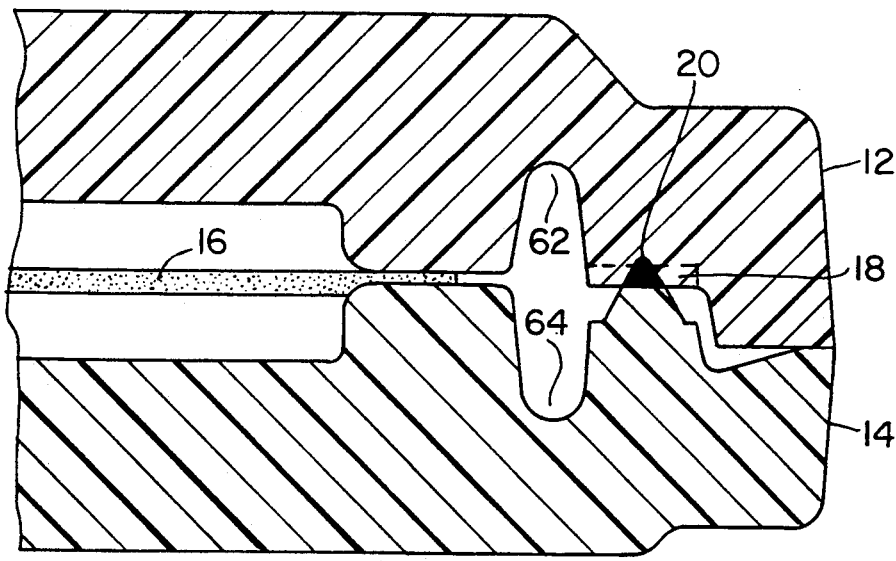
FIG. 8 is a cross-sectional view of stress relieving means for the structure of this invention which is free of shields.

Referring to FIG. 8, the embodiment of this invention is shown which utilizes two grooves 62 and 64 without shields. The grooves 62 and 64 function in the manner set forth above.

I claim:

1. A filtration apparatus formed from a top section having a first periphery sealed to a base section having a second periphery and a porous filtration membrane having a third periphery sealed to said base section, said porous filtration membrane being positioned between said top section and said base section, said top section having a fluid inlet said base section having a fluid outlet means to seal said second periphery to said first periphery which comprises a seal formed by ultrasonically welding a first energy director to a plurality of second energy directors, said first energy director extending about the entire circumference of one of said top section or said base section and said second energy directors extending radially and in contact with said first energy director and located on the other of said top section or said base section.

and a groove on the top section or base section positioned adjacent to one of said first energy director or said second energy directors.

2. The apparatus of claim 1 wherein said first energy director is positioned on said base section.

3. The apparatus of claim 1 wherein said first energy director is positioned on said top section.

4. The apparatus of any one of claims 1, 2 or 3 wherein a shield extension is positioned between said groove and said first energy director, said shield extending from said top section or said base section having said second energy directors.

5. The apparatus of claim 1 wherein both of said top section and said bottom section include one of said grooves.

6. The apparatus of claim 5 wherein both of said top section and said bottom section include a shield which aligns with groove in a section adjacent the section having said shield.

* * * * *